Nov. 9, 1965 L. S. SUOZZO 3,217,119
POSITION SENSING APPARATUS INCLUDING SWITCH MEANS FOR USE WITH
A LOAD SUBJECTED TO ANGULAR MOVEMENT
Filed Dec. 29, 1961 2 Sheets-Sheet 1
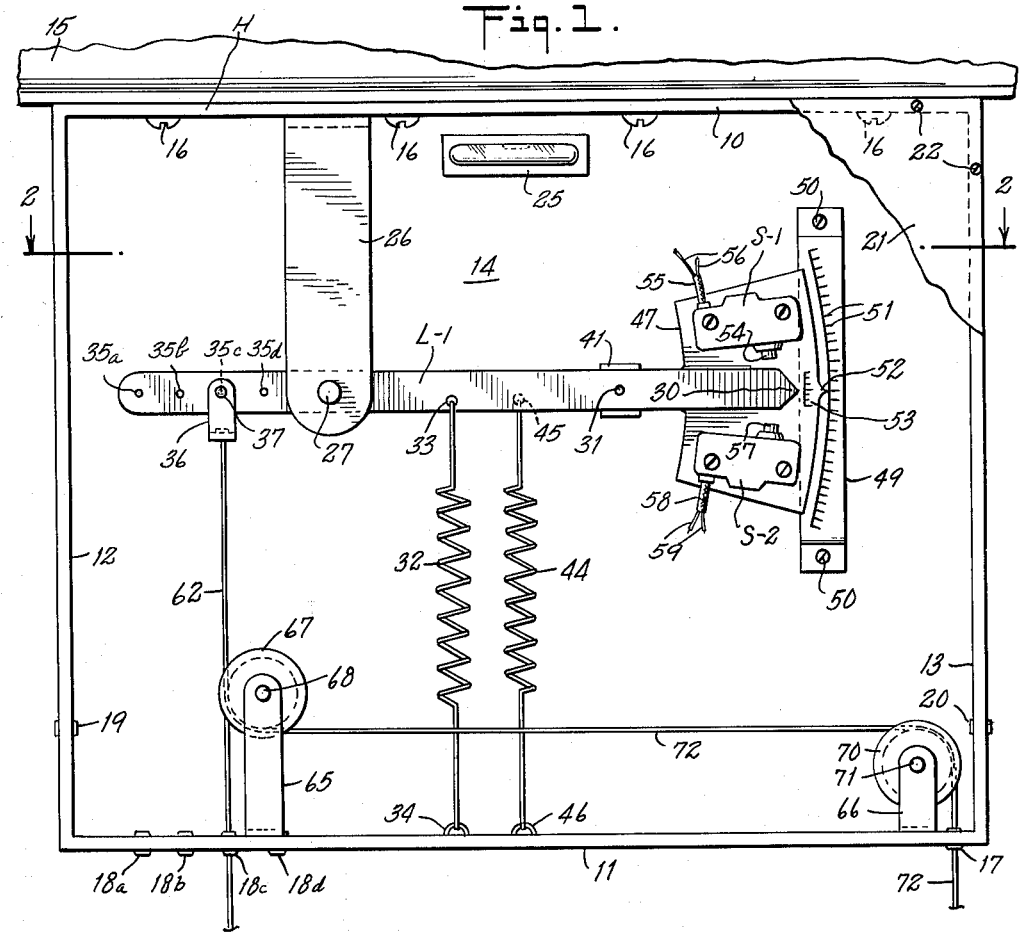
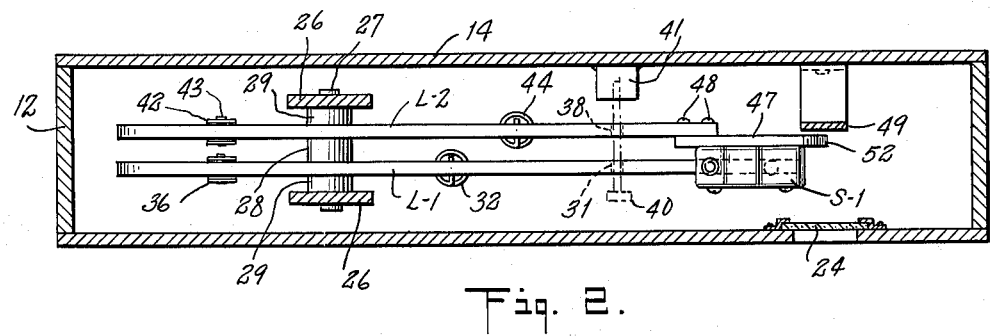
INVENTOR.
LEONARD S. SUOZZO
BY
*F. J. Pisarra*
ATTORNEY United States Patent Office 3,217,119
Patented Nov. 9, 1965

3,217,119
POSITION SENSING APPARATUS INCLUDING
SWITCH MEANS FOR USE WITH A LOAD
SUBJECTED TO ANGULAR MOVEMENT
Leonard S. Suozzo, Hackensack, N.J.
Filed Dec. 29, 1961, Ser. No. 163,260
12 Claims. (Cl. 200—52)

This invention relates to sensing apparatus in general and pertains, more particularly, to position sensing apparatus that is adapted for use with a load, such as piping, at least at portion of which is subjected to angular movement while in active use.

The position sensing apparatus of this invention has a number of uses. It is especially useful with piping loads and as an adjunct to support means for such loads. Accordingly and for the purposes of this application, the ensuing discussion and description and the accompanying drawings are directed to sensing apparatus of this invention as applied to piping loads.

Piping systems are utilized extensively in power plants and in various other types of installations to transmit steam or other high temperature fluids from one location to another. Changes in temperature of the fluid transmitted through the piping cause the piping to expand or contract depending on whether the fluid temperature is increased or decreased. It is important that the weight of the piping and its fluid contents be properly supported to prevent creation of undue and possibly dangerous stresses in the piping, as consequence of expansion or contraction of the piping material. The proper support of the weight of such piping has been a matter of serious concern to industry for many years.

There have been a number of important advances in the art of support devices for piping and the like in recent years. Such advances are exemplified by my Patents No. 2,903,213, granted September 8, 1959, for "Constant Support Device" and No. 2,939,663, granted June 7, 1960, for "Constant Support Device." The devices of these patents utilize spring forces to control vertical movement of a load.

Vertical movement of piping and similar loads may also be controlled by an electro-mechanical device which is devoid of springs, as disclosed in my pending patent applications Serial No. 45,394, now Patent No. 3,033,506, entitled "Motor-Actuated Suspension Type Constant Support Device," now Patent No. 3,033,506.

It has been ascertained that at least portions of piping loads, in many installations, are subjected to movements which result in angular deviations from a normal reference plane. It is important in instances of this type that such deviations be maintained within safe limits to prevent creation of undesirable stresses in the piping. There are no known apparati, except those disclosed in my pending applications Serial No. 109,886, now Patent No. 3,161,739 and Serial No. 150,258, for properly sensing these deviations and then placing a support device into active service whereby to compensate for the deviations. The apparatus of the present invention not only performs all of the functions of the apparatus disclosed in said Patent No. 3,161,739, but also affords a number of additional advantages. For one thing, it permits the use of a more compact arrangement of control devices. Moreover, certain forms of apparatus according to this invention have their parts so constructed and arranged as to allow for extensive movement of a piping load.

While the apparatus of this invention is related to that of said application Serial No. 150,258, it differs thereover in a number of important respects. For one thing, the electric switch means of the present apparatus is pivotal relative to a support instead of being slidable relative to the support, as in the case of the constructions disclosed in application Serial No. 150,258. Also, this invention utilizes a pivotal actuator lever in place of a sliding unit of said application for operating the switch means in response to predetermined differential pivotal movement of the switch means and the lever relative to the support.

It is the primary object of this invention to provide improved sensing apparatus which is responsive to predetermined variations in the angular position of a load, such as piping.

Another object of the invention is to provide position sensing apparatus for piping or the like, the sensing apparatus being adapted to cooperate with a support device for the piping whereby to place the support device into or out of active service, as required and in a manner to compensate for predetermined angular movement of the piping.

The invention has for a further object the provision of position sensing apparatus having its parts so constructed and arranged as to allow for extensive movement of a load and including a compact arrangement of control devices.

A still further object of the invention is to provide a sensing device of the character indicated that is simple and compact in design; that is sturdy and durable in construction; that is reasonable in manufacturing, installation and maintenance costs; and that is adapted to perform its intended functions in a dependable and trouble-free manner.

The enumerated objects and additional objects, together with the advantages of this invention, will be readily understood by persons skilled in the art from the following detailed description taken in conjunction with the accompanying drawings which respectively describe and illustrate several forms of construction embodying the invention.

In the drawings, wherein like reference characters denote corresponding parts throughout the several views:

FIGURE 1 is a view in front elevation of one recommended form of position sensing apparatus according to the invention, certain parts being broken away for better illustration of other parts;

FIGURE 2 is a view in cross-section taken along line 2—2 of FIGURE 1;

FIGURE 3 is an elevation view on a reduced scale illustrating the position sensing apparatus of FIGURE 1 operatively associated with a horizontal section of a piping load and with a support device;

FIGURE 4 is a view in front elevation, coresponding to FIGURE 1 and illustrating a first modification of the invention;

FIGURE 5 corresponds to FIGURE 4 and illustrates a second modification of the invention;

FIGURE 6 corresponds to FIGURE 1 and illustrates a third modification of the invention; and FIGURE 7 is a fragmentary view taken along line 7—7 of FIGURE 6.

Referring initially to FIGURES 1 and 2, I have illustrated therein a housing H which includes a top wall 10, a bottom wall 11, side walls 12 and 13 and a rear wall 14. The several walls are joined together, preferably by welding, to obtain a rigid frame structure which is secured to an overhead support, such as a building beam 15, by screws 16 or in any other suitable manner known to the art. Bottom wall 11 is provided with a first grommet 17 and a series of spaced grommets 18a, 18b, 18c and 18d. Side walls 12 and 13 are provided with corresponding grommets 19 and 20.

The housing also includes a removable front wall or cover plate 21 that is held in place by screws 22. The cover plate is equipped with a horizontal window 23 and a vertical window 24 (FIG. 3). Window 23 permits visual inspection of a bubble type level 25 which is mounted on the upper part of rear wall 14. Window 24 permits observation of parts within the housing which will be described.

Depending from housing top wall 10 is an inverted U-shaped bracket having a pair of parallel arms 26 which carry a pivot pin 27 proximate their free ends. A pair of levers, namely an actuator lever L–1 and a switch lever L–2 are mounted for pivotal movement on a pin 27. These levers are positioned between the bracket arms and are maintained in spaced relation to each other and to the bracket arms by spacer sleeves 28 and 29.

The end of lever L–1 to the right of pivot pin 27, as viewed in FIGURE 1, is tapered, as indicated at 30, and serves as an indicator pointer. An opening 31 is formed in the portion of lever L–1 intermediate pin 27 and pointer 30. A stabilizing spring 32, which is stressed in tension, is anchored at its ends to lever L–1 and to housing bottom wall 11, as indicated at 33 and 34, respectively. This spring normally and yieldingly biases lever L–1 in a clockwise direction about the axis of pin 27. The portion of lever L–1 to the left of pin 27 is provided with a series of equi-spaced openings 35a, 35b, 35c and 35d. A clevis 36 is pivotally connected to this lever by a pin 37 which registers with a selected one of the last-mentioned openings, such as opening 35c.

Lever L–2 has an opening 38 (FIG. 2) which corresponds to and is adapted to be aligned with opening 31 in lever L–1. A threaded locking pin 40 is adapted to be inserted through openings 31 and 38 and engage a tap (not shown) in a block 41 which is welded to housing rear wall 14, as shown in FIGURE 2. Pin 40 is inserted in place at the time the apparatus is assembled and is removed at the time the apparatus is installed and prior to being placed in active service. The purpose of this pin is to retain the levers in fixed position so as to protect the parts against undesirable relative movement and possible damage during transit.

Lever L–2 also has a series of openings (not shown) located to the left of pivot pin 27, as viewed in FIGURES 1 and 2, and corresponding to openings 35a through 35d. A clevis 42 is pivotally connected to lever L–2 by a pin 43 which registers with one of such openings. A stabilizing spring 44, corresponding to spring 32, is anchored at its ends to lever L–2 and to housing bottom wall 11, as indicated at 45 and 46, respectively. Spring 44 normally and yieldingly biases lever L–2 in a clockwise direction about the axis of pin 27.

A plate 47 is secured to an end portion of lever L–2 by screws 48 (FIG. 2). A gauge plate 49 is positioned adjacent plate 47 and is attached to housing rear wall 14 by screws 50. The gauge plate is provided with a series of graduations 51 which cooperate with a pointer 52, that is integral with plate 47, to indicate load travel. Plate 47 is provided with a similar series of graduations 53 which cooperate with pointer 30 to indicate angular deviation of lever L–1 relative to lever L–2. The above-identified graduations and corresponding pointers are visible through window 24.

A pair of spaced electric switches S–1 and S–2 is mounted on and movable with plate 47 and lever L–2. These switches are normally open. Switch S–1 includes a spring-pressed push button 54 and is connected to an electric cable 55 which contains a pair of electric leads 56. Switch S–2 includes a like push button 57 and is connected to an electric cable 58 which contains electric leads 59.

Switches S–1 and S–2 are connected to a motorized support unit M by cables 55 and 58, respectively, as indicated in FIGURE 3. Unit M comprises a reversible motor, gearing and a screw jack and may be the same as or similar to the support device which is disclosed in my said Patent No. 3,033,506, to which reference may be had for details of construction and operation. Unit M is preferably suspended from beam 15 and is connected to a load, in the form of a piping section P, by a rigid rod 60 and a strap 61. It is deemed sufficient for the purposes of this application to point out that, when one of the switches is closed, unit M is placed in active service and operates to impart upward movement to raise the portion of piping section P to which it is attached and, when the other switch is closed, unit M operates in reverse to lower said portion of the piping section.

Lever L–1 is coupled to the piping section by a flexible cable, wire line or the like 62 which is connected at one end to clevis 36 (FIG. 1) and at its other end to a strap 63 that is carried by the piping section (FIG. 3). As shown in FIGURE 1, cable 62 extends through grommet 18c in the housing bottom wall. Interposed in cable 62 is a means 64, such as a turnbuckle, for adjusting its effective length.

Affixed to housing bottom wall 11 are spaced upstanding U-shaped brackets 65 and 66. A first pulley 67 is mounted for rotation about the axis of a shaft 68 which is carried by bracket 65. A second pulley 70 is mounted for rotation about a shaft 71 which is carried by bracket 66. Shafts 68 and 71 and pivot pin 27 are parallel.

Lever L–2 is coupled to piping section P by a flexible cable, wire line or the like 72. This cable is secured at one end to clevis 42, passes under pulley 67 and over pulley 70, extends through the opening defined by grommet 17, and is connected at its other end to a strap 73 which is carried by the piping section. Interposed in cable 72 is a second turnbuckle 74 for adjusting its effective length.

It will be observed that straps 63 and 73 are fairly close together. The exact distance between these straps and the sensitivity of the apparatus to variations in angular deflection of the piping section depend on the selected openings in levers L–1 and L–2 to which respective clevises 36 and 42 are coupled. Such sensitivity may be enhanced by first disconnecting cable 72 from strap 73 and withdrawing it from grommet 17. This cable is then passed through and beyond grommet 20. The portion of the cable beyond grommet 20 is represented by a broken line in FIGURE 3. This portion of the cable is adapted to extend over a pulley 75 and be connected to a strap 76 which is carried by the piping section. Pulley 75 is mounted for rotation about the axis of a shaft 77 which is carried by a U-shaped bracket 78 that is suspended from beam 15. Both pulley 75 and strap 76 may be located at any suitable distances from the other parts of the apparatus.

For the purpose of outlining the operation of the form of the invention shown in FIGURES 1, 2 and 3, it is assumed that the position sensing apparatus is assembled and operatively connected to piping section P and to motorized unit M. At the time of installation, locking pin 40 is removed and cables 62 and 72 are adjusted in length so that the parts are in the relative position shown in FIGURE 1. With the parts in this position, lever L–1 is spaced from switches S–1 and S–2, the switches are in their normal open position, and unit M is out of active service.

The sensing apparatus is adapted to respond to predetermined variations in the angular position of piping section P, as will now be explained. In this connection, it is assumed that the piping section tilts downwardly toward the right, as viewed in FIGURE 3. Such tilting movement of the piping section causes corresponding pivotal movement of levers L–1 and L–2 in a counterclockwise direction, as viewed in FIGURE 1, through the medium of cables 62 and 72, respectively. Inasmuch as strap 73 is a greater distance from strap 61 than is strap 63, the pivotal or angular movement of lever L–2 will be greater than that of lever L–1 in response to the indicated tilting movement of the piping section. Hence, it will be noted that levers L–1 and L–2 are subjected to differential angular movement in response to tilting movement of the piping section. Upon predetermined differential angular movement of the levers in a counter-clockwise direction, lever L–1 engages and operates push button 57 to close switch S–2 and place motorized unit M into active service. Unit M operates to lower the left end portion of the piping and return it to normal position. At the same time, the parts within housing H will have returned to normal position by the action of springs 32 and 44 and switch S–2 will again be in its open position, thereby placing unit M out of active service.

Predetermined tilting movement of piping section P in a reverse direction, as viewed in FIGURE 3, effects sufficient corresponding differential angular movement of levers L–1 and L–2 in a clockwise direction to cause engagement of lever L–1 with push button 54. This closes switch S–1 and again places unit M in active but reverse service, thereby raising the left end portion of the piping section, as viewed in FIGURE 3, to return the same to normal position. Concurrently, the parts within housing H will have returned to normal position (FIG. 1) so that switch S–1 is reopened and unit M is placed out of active service.

FIGURE 4 illustrates a first modification of the invention. This modification includes a housing H–1 which is similar to earlier-described housing H. Positioned within the housing is a pair of levers L–1 and L–2 which are mounted for pivotal movement about the axis of a stationary pin 80 that corresponds to pivot pin 27 of FIGURE 1. The levers are disposed vertically and are normally maintained in the illustrated position by gravity or by stabilizing springs (not shown) which may be similar to springs 32 and 44. A flexible cable 81 is connected to the upper end of lever L–2 and is adapted to be connected to strap 73 of FIGURE 3. A second flexible cable 82 is connected to the upper end of lever L–1 and is adapted to be connected to strap 63. Cable 81 rides on a pulley 83 which is mounted for rotation about a stationary shaft 84. Cable 82 rides on pulleys 85 and 86 which are mounted for rotation about stationary shafts 87 and 88, respectively.

The operation of the form of the invention shown in FIGURE 4 is similar to that shown in FIGURES 1, 2 and 3.

Reference is next had to FIGURE 5 which illustrates a second modification of the invention which is closely related to that shown in FIGURE 4. The principal difference in the construction shown in FIGURE 5 compared to that shown in FIGURE 4 is that levers L–1 and L–2 are inverted, i.e. turned 180° about the axis of corresponding common pivot pin 90. The flexible cables in this modification are identified by numerals 91 and 92. Cable 91 successively engages a first pulley 93, which is rotatable about a stationary shaft 94, and a second pulley 95, which is rotatable about another stationary shaft 96. Cable 92 engages a pulley (not shown) which is positioned behind pulley 93 and is also rotatable about shaft 94.

The operation of the form of the invention shown in FIGURE 5 is similar to that of the earlier-described forms of the invention.

FIGURES 6 and 7 illustrate a third modification of the invention which includes a housing H–2 having a removable front cover plate 97 that is provided with a transparent window 98. Lever L–1 is pivotal about a pin 100 which is carried by a U-shaped bracket 101. Lever-2 is similarly pivotal about a pin 102 which is carried by a second U-shaped bracket 103. A plate 104 is secured to lever L–1 by screws 105. This plate is provided with an arcuate slot 106 to permit viewing of a gauge plate 107 that is affixed to the rear wall of the housing. The gauge plate is provided with a first series of graduations 108 to indicate load travel and a second series of graduations 109 to indicate relative angular deviations. An arcuate plate 110 is attached to an end of lever L–2 by screws 111. This plate is configured as shown and is adapted to actuate switches S–1 and S–2 in response to predetermined variations in corresponding angular movements of the levers. It will be noted that, in the construction shown in FIGURES 6 and 7, levers L–1 and L–2 are pivotal about spaced parallel pins 100 and 102, respectively, instead of about a common pin 27 (FIG. 1). Also in FIGURES 6 and 7, the switches are carried by lever L–1 and operated by lever L–2 whereas in the construction shown in FIGURE 1, the switches are carried by lever L–2 and operated by lever L–1.

The modification of the invention illustrated in FIGURES 6 and 7 operates in a manner similar to earlier-described forms of the invention.

From the foregoing, it is believed that the construction, operation, objects and advantages of my present invention will be readily comprehended by persons skilled in the art, without further description. It is to be clearly understood, however, that various changes in the constructions described above and illustrated in the drawings may be made without departing from the scope of the invention, it being intended that all matter contained in the description or shown in the drawings shall be interpreted as illustrative only and not in a limiting sense.

I claim:

1. In apparatus for use with a load, such as piping, at least a portion of which is subjected to angular movement while in active service, a support, a first lever unit carried by and pivotal relative to the support, first coupling means connected to the first lever unit and adapted to be connected to the load, a second lever unit carried by and pivotal relative to the support, and second coupling means connected to the second lever unit and adapted to be connected to the load at a point spaced from the connection of the first coupling means to the load, said first and second coupling means adapted to impart differential pivotal movement to the lever units in response to angular movement of the load in one direction, one of the lever units including electric switch means, the other lever unit including means for operating the switch means in response to predetermined differential pivotal movement of the lever units relative to the support.

2. Apparatus according to claim 1 wherein the first and second coupling means are adapted to be connected to the load at corresponding spaced locations and wherein each coupling means includes a flexible connector.

3. In apparatus for use with a load, such as piping, at least a portion of which is subjected to angular movement while in active service, a support, first and second lever units carried by and pivotal relative to the support about a common axis, first coupling means connected to the first lever unit and adapted to be connected to the load, and second coupling means connected to the second lever unit and adapted to be connected to the load at a point spaced from the connection of the first coupling means to the load, said first and second coupling means adapted to impart differential pivotal movement to the lever units in response to angular movement of the load in one direction, one of the lever units including electric switch means, the other lever unit including means for operating the switch means in response to predetermined differential pivotal movement of the lever units relative to the support.

4. In apparatus for use with a load, such as piping, at least a portion of which is subjected to angular movement while in active service, a support, a first lever unit carried by and pivotal relative to the support about a first axis, first coupling means connected to the lever and adapted to be connected to the load, a second lever unit carried by and pivotal relative to the support about a second axis which is spaced from the first axis, and second coupling means connected to the second lever unit and adapted to be connected to the load at a point spaced from the connection of the first coupling means to the load, said first and second coupling means adapted to impart differential pivotal movement to the lever units in response to angular movement of the load in one direction, one of the lever units including electric switch means, the other lever unit including means for operating the switch means in response to predetermined differential pivotal movement of the lever units relative to the support.

5. Apparatus according to claim 4 wherein said first and second axes are substantially parallel.

6. In apparatus for use with a load, such as piping, at least a portion of which is subjected to angular movement while in active service, a support, a first lever unit carried by and pivotal relative to the support, first coupling means connected to the first lever unit and adapted to be connected to the load, a second lever unit carried by and pivotal relative to the support, second coupling means connected to the second lever unit and adapted to be connected to the load at a point spaced from the connection of the first coupling means to the load, and biasing means normally urging both lever units in one direction relative to the support, said coupling means adapted to impart differential pivotal movement to the lever units against the action of the biasing means in response to angular movement of the load in one direction, one of the lever units including electric switch means, the other lever unit including means for operating the switch means in response to predetermined differential pivotal movement of the lever units relative to the support.

7. Apparatus according to claim 6 wherein the biasing means comprises a first spring connected to the first lever unit and to the support and a second spring connected to the second lever unit and to the support.

8. In apparatus for use with a load, such as piping, at least a portion of which is subjected to angular movement while in active service, a support, a first lever unit carried by and pivotal relative to the support, first coupling means connected to the first lever unit and adapted to be connected to the load, a second lever unit carried by and pivotal relative to the support, and second coupling means connected to the second lever unit and adapted to be connected to the load at a point spaced from the connection of the first coupling means to the load, said first and second coupling means adapted to impart differential pivotal movement to the lever units in response to angular movement of the load in one direction, one of the lever units including a pair of electric switches, the other lever unit including means for operating one of the switches in response to predetermined differential pivotal movement of the lever units relative to the support in one direction and for operating the other switch in response to predetermined differential pivotal movement of the lever units in a reverse direction relative to the support.

9. Apparatus according to claim 8 wherein the first and second coupling means are adapted to be connected to the load at corresponding spaced locations and wherein each coupling means includes a flexible connector.

10. In apparatus for use with a load, such as piping, at least a portion of which is subjected to angular movement while in active service, a support, first and second lever units carried by and pivotal relative to the support about a common axis, first coupling means connected to the first lever unit and adapted to be connected to the load, and second coupling means connected to the second lever unit and adapted to be connected to the load at a point spaced from the connection of the first coupling means to the load, said first and second coupling means adapted to impart differential pivotal movement to the lever units in response to angular movement of the load in one direction, a pair of electric switches, the other lever unit including means for operating one of the switches in response to predetermined pivotal movement of the lever units relative to the support in one direction and for operating the other switch in response to predetermined differential pivotal movement of the lever units in a reverse direction relative to the support.

11. In apparatus for use with a load, such as piping, at least a portion of which is subjected to angular movement while in active service, a support, a first lever unit carried by and pivotal relative to the support about a first axis, first coupling means connected to the lever and adapted to be connected to the load, a second lever unit carried by and pivotal relative to the support about a second axis which is spaced from the first axis, and second coupling means connected to the second lever unit and adapted to be connected to the load at a point spaced from the connection of the first coupling means to the load, said first and second coupling means adapted to impart differential pivotal movement to the lever units in response to angular movement of the load in one direction, a pair of electric switches, the other lever unit including means for operating one of the switches in response to predetermined differential pivotal movement of the lever units relative to the support in one direction and for operating the other switch in response to predetermined differential pivotal movement of the lever units in a reverse direction relative to the support.

12. Apparatus according to claim 11 wherein said first and second axes are parallel.

References Cited by the Examiner
UNITED STATES PATENTS

| | | | |
|---|---|---|---|
| 2,743,331 | 4/56 | Lauder et al. | 200—153 |
| 2,809,260 | 10/57 | Beckett | 200—153 |
| 2,974,915 | 3/61 | Zollinger | 248—58 |

BERNARD A. GILHEANY, *Primary Examiner.*